April 24, 1945.   E. H. RUGG   2,374,622
OUTLET BOX ARRANGEMENT FOR ELECTRICAL WIRING SYSTEM
Filed July 21, 1943
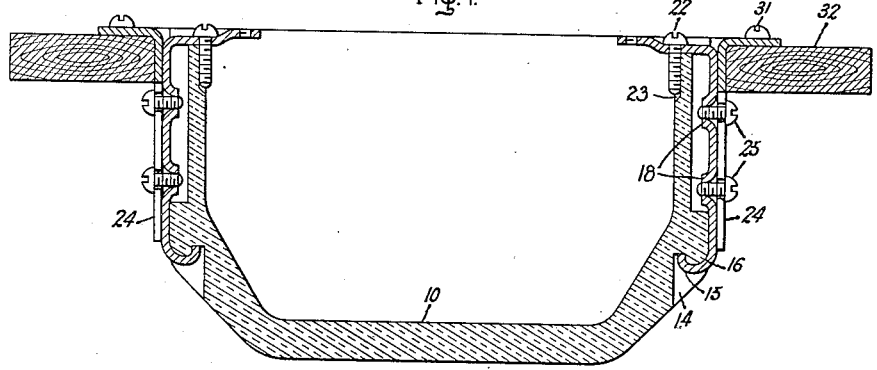
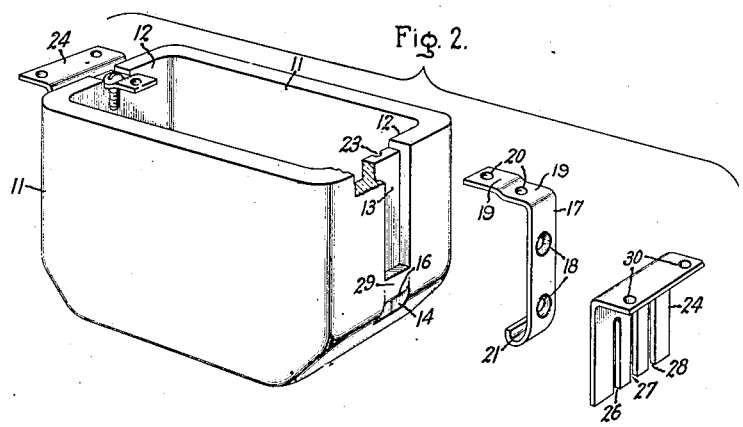
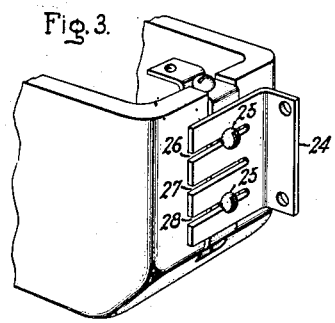
Inventor:
Edward H. Rugg,
by Harry E. Dunham
His Attorney Patented Apr. 24, 1945

2,374,622

UNITED STATES PATENT OFFICE 2,374,622

OUTLET BOX ARRANGEMENT FOR ELECTRICAL WIRING SYSTEMS

Edward H. Rugg, Bridgeport, Conn., assignor to General Electric Company, a corporation of New York Application July 21, 1943, Serial No. 495,611

5 Claims. (Cl. 174—58)

The present invention relates to outlet box arrangements for electrical wiring systems to accommodate and support switches, terminals, fuses or like elements commonly used in electrical wiring installations.

The object of my invention is to provide an improved construction of such outlet box arrangements which can be manufactured at low cost, installed in any one of several positions, and readily assembled and dismantled.

For a consideration of what I believe to be novel and my invention, attention is directed to the following description and the claims appended thereto in connection with the accompanying drawing.

In the drawing Fig. 1 illustrates a sectional view of an installed outlet box arrangement according to my invention; Fig. 2 is a perspective, exploded view of the arrangement; and Fig. 3 is a perspective view of the arrangement in a different mounting position.

The outlet box arrangement shown in the drawing comprises a box 10 made of non-metallic material such as a ceramic or plastic material having front and rear walls 11 and side walls 12. Each side wall has an outer surface forming a central recess 13 which at its upper end extends through the top of the side wall into the chamber formed by the box. Another recess 14 is formed in the outer surface of each side wall spaced from the lower end of the recess 13. The recess 14 has a slot 15 and forms a rounded, depending side wall portion 16. This portion 16 together with the recess 13 serves to locate and support a strap 17. The strap 17 has a vertical portion with two vertically spaced, threaded bores 18 and a horizontal upper end portion 19 with two horizontally spaced, threaded bores 20. The lower end of the strap 17 is bent backward, thus forming a hook 21. When assembled the hook 21 embraces or straddles the projecting side wall portions 16, the end of the hook being located in the slot 15, and the horizontal portion 19 being located in the upper part of the recess 13, its free end projecting horizontally into the box chamber. When assembled the frictional engagement between the side wall and the hook 21 and the horizontal part hold the strap on the side wall of the box. Each strap in addition is securely held in position by means of a screw 22 threaded into the hole 20 near the vertical strap portion in close proximity to the inner surface of the side wall. Preferably the inner surface of the side wall is provided with a recess 23 for accommodating and accurately locating the screw 22. Such recess 23 is formed initially in the manufacture of the porcelain box.

The free end of the horizontal portion 19 with the outer hole 20 serves to support the mounting strap of a switch or like device, not shown, when mounted in the box.

Two brackets 24 are secured to the straps 17 by means of screws 25. Each bracket has a vertical portion provided with three spaced parallel open slots 26, 27 and 28. In the position of Figs. 1 and 2 the screws 25 pass through the central slot 27 and are screwed into the threaded bores 18 of the vertical strap portion. The screws are of a length sufficient to pass through the threaded bores 18 without bearing against the porcelain side wall of the box to avoid injury to the latter. This is accomplished by the provision of the vertical portion of the slot 13 which spaces the strap and the box side wall. From another viewpoint, each side wall of the box includes a spacer or spacing means 29, in the present instance formed between the slots 13 and 14 to space a portion of the strap 17 from the side wall.

Each mounting bracket 24, in addition to the vertical portion, has a horizontal portion with two openings 30 for receiving screws 31 or like holding means to attach the bracket 24 to rafters 32 or like structural elements of a building. The vertical slots 26, 27, 28 permit vertical positioning of the box so that when assembled, for instance, the horizontal portion 19 of the strap is in alignment with the horizontal portion of the bracket 24 as in Figs. 1 and 2.

The mounting of the arrangement shown in Figs. 1 and 2 may be considered standard. In certain instances it is desirable to arrange the box for side mounting with the bracket 24 turned 90 angular degrees in the plane of the vertical bracket portion relative to the box. Such side mounting is illustrated in Fig. 3. The bracket 24 is turned 90 degrees relative to the box so that the slots 26, 27 and 28 are horizontally located. The box with the straps 17 is mounted on the bracket 24 by the screws 25 which in Fig. 3 extend through the slots 26, 28.

The outlet box arrangement according to my invention is simple and inexpensive in manufacture and easy to mount and to adjust. The entire arrangement includes 3 parts only. The box preferably made of porcelain or other suitable non-metallic material, a strap attached to the box acting as a support for an element to be mounted in the box and for supporting the box on the third element, namely a bracket. Such bracket and strap are constructed for standard mounting and side mounting of the box and permit several positions in each type of mounting.

What I claim as new and desire to secure by Letters Patent of the United States is:

1. Outlet box arrangement for electrical wiring system comprising a box having opposite side walls each with a central slot extending through the edge and across the top of the side wall, a recess with a slot in the lower portion of each side wall, a strap engaging each side wall having a hook portion projecting into the recess and the slot in the lower portion of the side wall and a horizontal portion located in the slot across the top of the side wall, a screw threaded into said horizontal portion and engaging the inner surface of the side wall, and a bracket detachably and adjustably connected to the strap, said horizontal portion having an extension in the box adapted to support an electrical wiring device.

2. Outlet box arrangement for electrical wiring system comprising a box made of non-metallic material having side walls each with a slot across the open top of the box and a projection formed near a lower portion of the side wall, a strap having a lower hooked end portion straddling said projection and an upper horizontal portion positioned in the slot, a screw threaded into the horizontal portion and engaging the inner surface of the side wall to secure the strap to the side wall, and bracket means detachably secured to the strap for supporting the box on a frame structure said horizontal portion having an extension in the box adapted to support an electrical wiring device.

3. Outlet box arrangement for electrical wiring system comprising a box having side walls each with a spacing member, a slot in the side wall above said spacing member and a projection formed on the side wall below the spacing member, a strap engaging the spacing member and having a hooked end portion straddling said projection and another end portion extending through the slot into the box and having a threaded opening for attachment to an electrical wiring device in the box, and a supporting bracket for each strap comprising a portion having parallel slots and screws extending through the slots and secured to the strap.

4. Outlet box arrangement for electrical wiring system comprising a box made of non-metallic material having an open top and side walls each having a slot through the top end thereof and a recessed lower portion forming a projection, a strap having a lower hooked portion straddling said projection and a horizontal upper portion extending through the slot into the box, a screw threaded through the horizontal portion to secure the strap to the box, said horizontal portion having an extension in the box for attachment to an electrical wiring device and a mounting bracket for each strap having a vertical portion with a plurality of spaced slots, and screw means detachably securing said vertical portion to the strap in different angular positions relative to the strap.

5. Outlet box arrangement for electrical wiring system comprising a box made of non-metallic material having side walls each with a slot across the open top of the box and a projection formed near a lower portion of the side wall, a strap having a lower hooked end portion straddling said projection and an upper portion positioned in the slot and extending into the box for supporting an electrical wiring device therein, an intermediate portion of the strap having two spaced screw-threaded openings, and means for supporting the box on a frame structure comprising a bracket having a wall with three parallel spaced slots, the spacing between the outer slots being equal to the spacing between the threaded openings, and two screws projecting in one position through one of the slots and being screwed into the openings and each projecting in another position of the bracket through one of the outer slots.

EDWARD H. RUGG.